United States Patent
Zak et al.

(10) Patent No.: US 10,135,711 B2
(45) Date of Patent: Nov. 20, 2018

(54) TECHNOLOGIES FOR SIDEBAND PERFORMANCE TRACING OF NETWORK TRAFFIC

(71) Applicant: Intel Corporation, Santa Clara, CA (US)

(72) Inventors: Robert C. Zak, Bolton, MA (US); David Keppel, Mountain View, CA (US); James Dinan, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 14/979,140

(22) Filed: Dec. 22, 2015

(65) Prior Publication Data
US 2017/0180235 A1 Jun. 22, 2017

(51) Int. Cl.
*H04L 12/26* (2006.01)
*H04L 12/721* (2013.01)

(52) U.S. Cl.
CPC .......... *H04L 43/106* (2013.01); *H04L 43/028* (2013.01); *H04L 43/04* (2013.01); *H04L 43/0876* (2013.01); *H04L 45/26* (2013.01)

(58) Field of Classification Search
CPC ........ H04L 43/04; H04L 43/06–43/067; H04L 43/08–43/0894; H04L 43/10–43/106; H04L 43/12; H04L 43/16
See application file for complete search history.

(56) References Cited

U.S. PATENT DOCUMENTS

| 7,944,844 | B2 | 5/2011 | Ee et al. | |
|---|---|---|---|---|
| 2007/0121626 | A1* | 5/2007 | Shepard | H04L 43/00 370/389 |
| 2007/0147258 | A1* | 6/2007 | Mottishaw | H04L 43/12 370/241 |
| 2010/0061253 | A1 | 3/2010 | Kaminsky et al. | |
| 2013/0322258 | A1 | 12/2013 | Nedeltchev et al. | |
| 2014/0211639 | A1 | 7/2014 | Matthews et al. | |
| 2015/0215206 | A1 | 7/2015 | Solis et al. | |

OTHER PUBLICATIONS

International search report for PCT/US2016/063342, dated Feb. 22, 2017 (3 pages).
Written Opinion for PCT/US2016/063342, dated Feb. 22, 2017 (7 pages).

* cited by examiner

*Primary Examiner* — Pao Sinkantarakorn
(74) *Attorney, Agent, or Firm* — Barnes & Thornburg LLP

(57) ABSTRACT

Technologies for tracing network performance include a network computing device configured to receive a network packet from a source endpoint node, process the received network packet, capture trace data corresponding to the network packet as it is processed by the network computing device, and transmit the received network packet to a target endpoint node. The network computing device is further configured to generate a trace data network packet that includes at least a portion of the captured trace data and transmit the trace data network packet to the destination endpoint node. The destination endpoint node is configured to monitor performance of the network by reconstructing a trace of the network packet based on the trace data of the trace data network packet. Other embodiments are described herein.

25 Claims, 7 Drawing Sheets

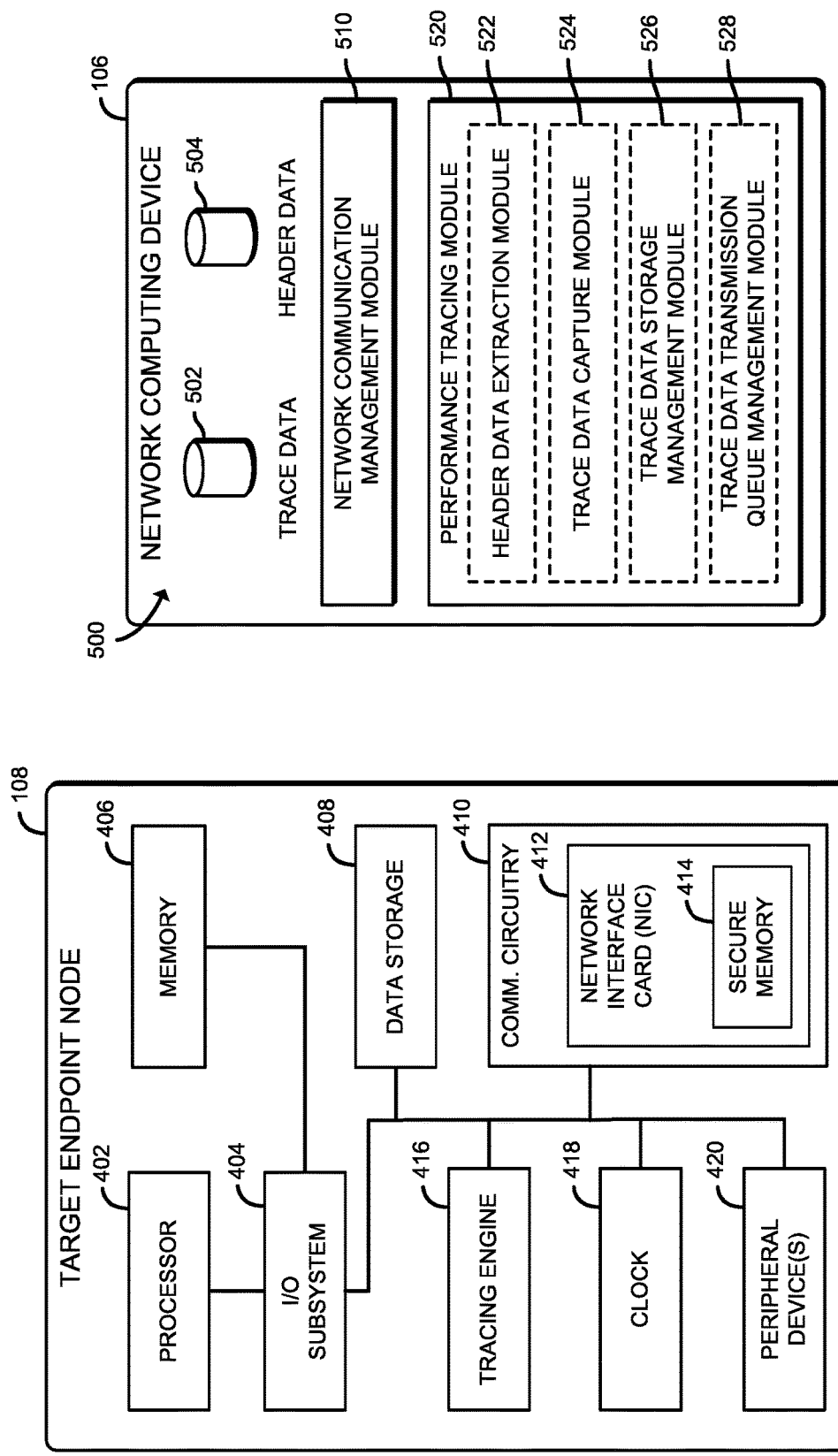

TECHNOLOGIES FOR SIDEBAND PERFORMANCE TRACING OF NETWORK TRAFFIC

GOVERNMENT RIGHTS CLAUSE

This invention was made with Government support under contract number H98230-13-D-0124 awarded by the Department of Defense. The Government has certain rights in this invention.

BACKGROUND

Network operators and communication service providers typically rely on complex, large-scale computing environments, such as high-performance computing (HPC) and cloud computing environments. Due to the complexities associated with such large-scale computing environments, communication performance issues in such HPC systems can be difficult to detect and correct. This problem can be more difficult for performance anomalies (e.g., incast), which can result from the dynamic behavior of an application running on the system or the behavior of the system itself.

For example, partitioned global address space (PGAS) applications that perform global communication at high message rates can incur network congestion that may be exacerbated by system noise, which may result in performance degradation. Accordingly, HPC systems typically depend on efficient use of the inter-node fabric; however, for many applications, performance is generally limited by fabric performance, as well as by processor, memory, or mass storage performance. Further, due to the complexities associated with HPC system architectures, such fabric performance may be difficult to measure and traffic patterns difficult to understand, making it difficult to identify a root cause of performance problems within the fabric.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4 is a simplified block diagram of at least one embodiment of the target endpoint node of the system of FIG. 1;

FIG. 5 is a simplified block diagram of at least one embodiment of an environment that may be established by the network computing device of FIG. 3;

DETAILED DESCRIPTION OF THE DRAWINGS

Figure 1:
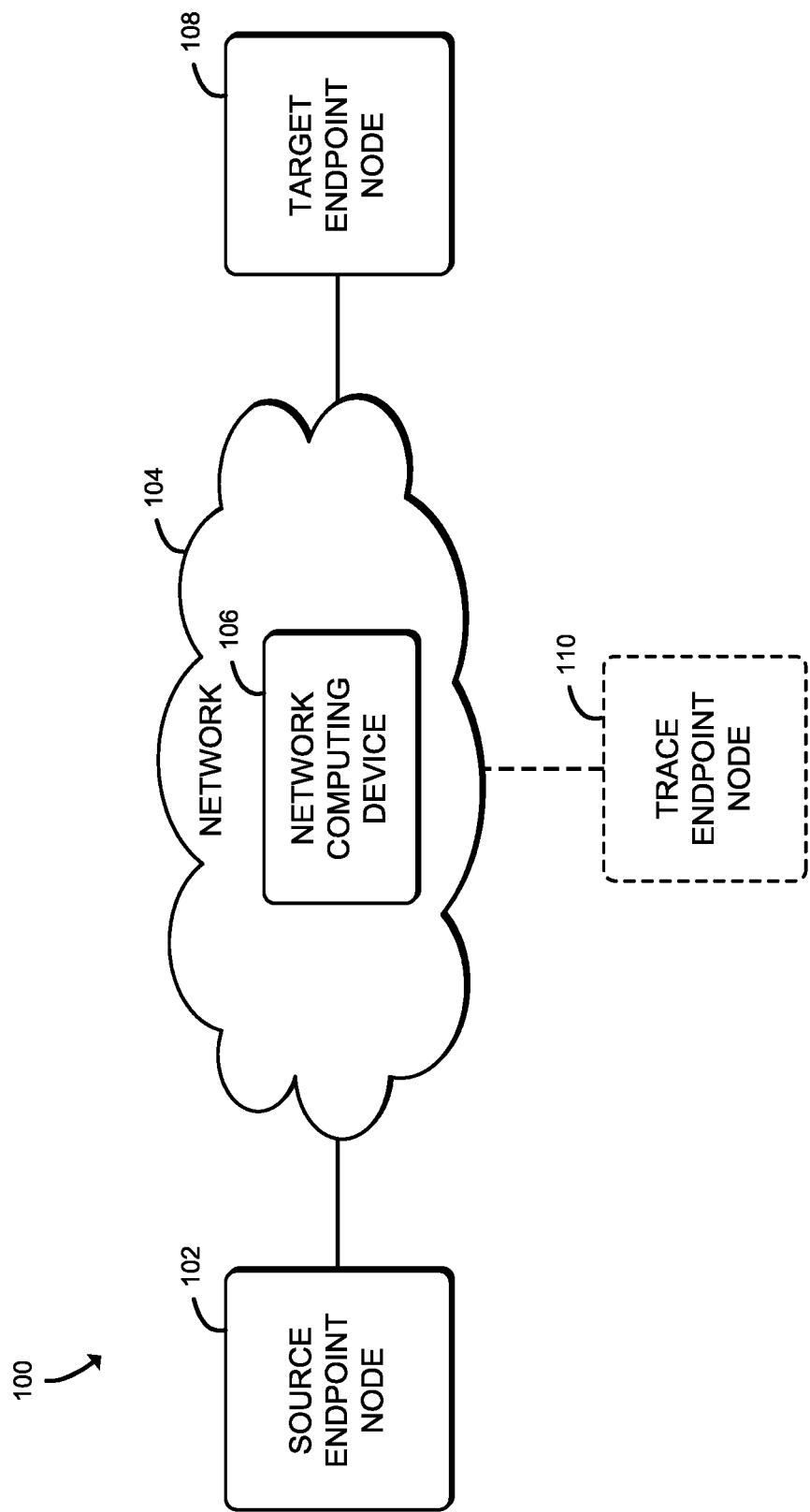
FIG. 1 is a simplified block diagram of at least one embodiment of a system for sideband performance tracing of network traffic from a source endpoint node to a target endpoint node via a network computing device of a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for sideband performance tracing of network traffic (i.e., network packets, messages, etc.) includes a source endpoint node 102 communicatively coupled to a target endpoint node 108 via a network computing device 106 of a HPC network 104. In some embodiments, the system 100 may additionally include a trace endpoint node 110 communicatively coupled to the network computing device 106 via the HPC network 104.

In use, a network packet is generated at the source endpoint node 102 (e.g., at the request of an application being executed on the source endpoint node 102) and forwarded to the network computing device 106. The network computing device 106 is configured to perform various operations (e.g., processing services, analysis, forwarding, etc.) on the received network packet. Based on the operations performed on the network packet, the network computing device 106 is configured to forward the network packet or drop the network packet.

In some network architecture embodiments, design rules for the network architecture may not allow modifying of a packet inline (i.e., trace data cannot be inserted into the network packet in-flight through the HPC network 104). As such, when performance tracing of the network traffic through the HPC network 104 is enabled, as a network packet flows through the system 100 (see, e.g., the network packet flow of FIG. 7), one or more computing devices (e.g., the source endpoint node 102, the network computing device 106, the target endpoint node 108, etc.) may be configured to record trace data corresponding to events related the network packet, such as ingress, queueing, egress, etc. The trace data may include any type of information related to network packet travelling through the HPC network 104, such as a timestamp recording a time of interest (e.g., a time of ingress, a time at which the network packet was queued, a time of egress, etc.), routing information (e.g., a source identifier, a destination identifier, etc.), delay information (e.g., an amount of time between queuing and egress, a number of cycles between ingress and egress, etc.), decision-making information (e.g., why the network packet was forwarded to a particular network computing device 106), information regarding one or more characteristics (e.g., a temperature, an internal buffer usage, a processor usage percentage, a memory usage, etc.) of one or more components of the device that generated, processed, forwarded, and/or received the network packet, etc.

Each computing device configured to record the trace data may store the trace data locally for subsequent retrieval, such as in a trace buffer, or trace buffer. Such stored trace data is subsequently transmitted in a separate network packet outside of the performance tracing measurement interval (i.e., sideband) at some point in time after the network packet has been forwarded. In other words, each computing device configured to record the trace data is additionally configured to generate a secondary network packet (i.e., a trace data network packet), subsequent to forwarding the received network packet, that includes at least a portion of the trace data recorded for the received network packet and forward the trace data network packet to a destination endpoint node (e.g., the target endpoint node 108, the trace endpoint node 110, etc.) or another network computing device 106.

Upon reaching the destination endpoint node, a trace corresponding to the trace data may be reconstructed. In other words, the network computing device 106 may be configured to transmit the trace data to the target endpoint node 108 or the trace endpoint node 110, depending on the embodiment. Accordingly, the target endpoint node 108 or the trace endpoint node 110, depending on the embodiment, is configured to reconstruct the trace based on the trace data received.

It should be appreciated that while only a single network computing device 106 is shown in the illustrative system 100, the HPC network 104 may include a plurality of network computing devices 106 forming various paths through which the network packet may be forwarded through the HPC network 104. Accordingly, it should be further appreciated that, depending on the architecture of the HPC network 104 and a flow of the network packet, the network packet may be transmitted through a plurality of network computing devices 106 before being forwarded to the target endpoint node 108.

The source endpoint node 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system.

Figure 2:
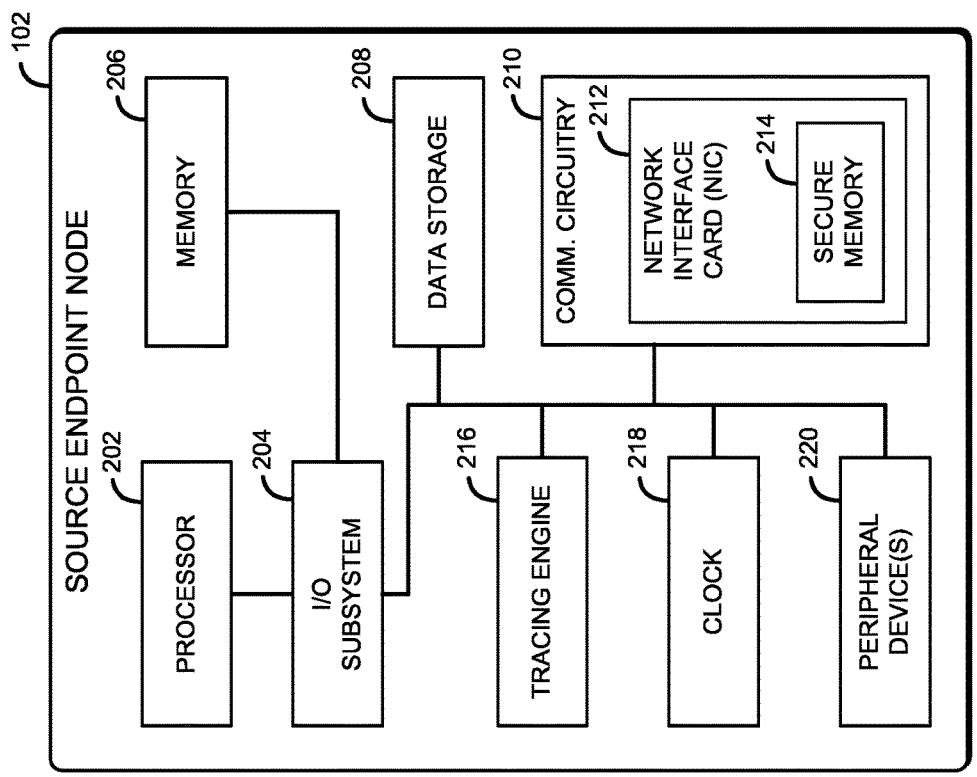
FIG. 2 is a simplified block diagram of at least one embodiment of the source endpoint node of the system of FIG. 1.

As shown in FIG. 2, the illustrative source endpoint node 102 includes a processor 202, an input/output (I/O) subsystem 204, a memory 206, a data storage device 208, communication circuitry 210, a tracing engine 216, a clock 218, and one or more peripheral devices 220. Of course, the source endpoint node 102 may include other or additional components, such as those commonly found in a computing device, in other embodiments. Additionally, in some embodiments, one or more of the illustrative components may be incorporated in, or otherwise form a portion of another component. For example, the memory 206, or portions thereof, may be incorporated in the processor 202, in some embodiments. It should be appreciated that, in some embodiments, one or more of the illustrative components may be omitted from the source endpoint node 102.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein. In operation, the memory 206 may store various data and software used during operation of the source endpoint node 102, such as operating systems, applications, programs, libraries, and drivers.

The memory 206 is communicatively coupled to the processor 202 via the I/O subsystem 204, which may be embodied as circuitry and/or components to facilitate input/output operations with the processor 202, the memory 206, and other components of the source endpoint node 102. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the source endpoint node 102, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. It should be appreciated that the data storage device 208 and/or the memory 206 (e.g., the computer-readable storage media) may store various data as described herein, including operating systems, applications, programs, libraries, drivers, instructions, etc., capable of being executed by a processor (e.g., the processor 202) of the source endpoint node 102.

The communication circuitry 210 may be embodied as any communication circuit, device, or collection thereof, capable of enabling communications between the source endpoint node 102 and other computing devices (e.g., the network computing device 106, the target endpoint node 108, etc.) over a network (e.g., the HPC network 104). The communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 210 includes a network interface controller (NIC) 212, also commonly referred to as a host fabric interface (HFI) in such HPC networks 104. The NIC 212 may be embodied as one or more add-in-boards, daughtercards, network interface cards, controller chips, chipsets, or other devices that may be used by the source endpoint node 102. For example, in some embodiments, the NIC 212 may be integrated with the processor 202, embodied as an expansion card coupled to the I/O subsystem 204 over an expansion bus (e.g., PCI Express), part of a SoC that includes one or more processors, or included on a multichip package that also contains one or more processors. Additionally or alternatively, in some embodiments, functionality of the NIC 212 may be integrated into one or more components of the source endpoint node 102 at the board level, socket level, chip level, and/or other levels.

The illustrative NIC 212 includes a secure memory 214. The secure memory 214 of the NIC 212 may be embodied as any type of memory that is configured to securely store data local to the NIC 212. It should be appreciated that, in some embodiments, the NIC 212 may further include a local processor (not shown) local to the NIC 212. In such embodiments, the local processor of the NIC 212 may be capable of performing functions (e.g., replication, network packet processing, etc.) that may be offloaded to the NIC 212.

The tracing engine 216 may be embodied as any hardware, firmware, software, or combination thereof (e.g., limited-function high-speed hardware) capable of being configured by a processor (e.g., the processor 202) of the source endpoint node 102 and performing the various functions described herein, such as collecting performance-relevant data (i.e., trace data) and making the performance-relevant data available for performance analysis. In some embodiments, the tracing engine 216 may form a portion of the processor 202 or otherwise may be established by the processor 202. In other embodiments, the tracing engine 216 may be embodied as an independent circuit or processor (e.g., a specialized co-processor or application specific integrated circuit (ASIC)).

The tracing engine 216 is configured to manage trace data at the source endpoint node 102. To do so, the tracing engine 216 is configured to generate trace data related to a network packet, such as may be generated by the source endpoint node 102, and store the generated trace data in a local trace buffer (see, e.g., the trace buffer 706 of the illustrative source endpoint node 102 of FIG. 7). As described previously, the trace data may include any type of information related to network traffic travelling through the HPC network 104, such as routing information, delay information, reception/transmission queue information, decision-making information, information regarding one or more characteristics of one or more components of the source endpoint node 102, etc.

The tracing engine 216 is further configured to retrieve at least a portion of the trace data from the trace buffer and insert the retrieved trace data, as well as tagging information, into another network packet different from the network packet for which the trace data was generated. In other words, the tracing engine 216 is configured to generate a separate network packet (i.e., a trace data network packet) to transmit the trace data to the network computing device 106 out of line, or sideband. The tagging information may include any data usable to reconstruct the trace (e.g., via the trace data of the trace data network packets) source identifying information, destination identifying information, flow identifying information, path identifying information, a packet sequence number, as well as characteristics associated with the tagged information, such as a time of interest (e.g., an ingress time, an egress time, a queued time, etc.) recorded via a timestamp. It should be appreciated that the tagging information may additionally be used to distinguish between trace data network packets and the network packets for which the trace data of the trace data network packets was generated. Further, such tagging information may indicate which area of memory should receive a data portion (i.e., a payload) of the network packet.

In some embodiments, the tracing engine 216 may be configured to interpret a setting of the source endpoint node 102 that indicates whether to generate/forward performance data of network traffic (i.e., whether to track trace data of network packets) through the HPC network 104. In such embodiments, the tracing engine 216 may be further configured to update one or more bits of a header of network packets being transmitted from the source endpoint node 102 that indicate whether performance tracing of the network packets is enabled. It should be appreciated that additional and/or alternative information may be represented in the one or more bits of the header, such as a type of trace data to be collected, a size of the trace data to be collected (e.g., whether the trace data should be compressed), etc.

The clock 218 may be embodied as any software, hardware component(s), and/or circuitry from which a timestamp can be generated therefrom and is otherwise capable of performing the functions described herein. For example, in the illustrative embodiment, the clock 218 may be implemented via an on-chip oscillator. In some embodiments, the clock 218 may be shared (e.g., multiple distributed clocks being generally synchronized using a synchronization protocol).

The peripheral devices 220 may include any number of input/output devices, interface devices, and/or other peripheral devices. For example, in some embodiments, the peripheral devices 220 may include a display, a touch screen, graphics circuitry, a keyboard, a mouse, a microphone, a speaker, and/or other input/output devices, interface devices, and/or peripheral devices. The particular devices included in the peripheral devices 220 may depend on, for example, the type and/or intended use of the source endpoint node 102.

The peripheral devices 220 may additionally or alternatively include one or more ports, such as a USB port, for example, for connecting external peripheral devices to the source endpoint node 102.

Referring again to FIG. 1, the HPC network 104, also commonly referred to as an HPC fabric, may be embodied as any type of HPC architecture capable of aggregating computing power in a manner such that advanced application programs can be run efficiently, reliably, and quickly. Unlike local area networks (LANs) and a wide area networks (WANs), which tend to have larger messages and packets, burstier operation (significant idle periods and significantly-frequent idle periods), and relatively long distances (where the speed of light limits some time constants which in turn constrain the design of long-haul networks), the HPC network 104 is configured to sustain very high rates of small-message traffic over short distances.

It should be appreciated that the source endpoint node 102, the target endpoint node 108, and/or the trace endpoint node 110 may be connected to the HPC network 104 via another network, such as a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. In other words, the HPC network 104 may serve as a centralized network and, in some embodiments, may be communicatively coupled to another network (e.g., the Internet). Accordingly, the other network may include a variety of other network computing devices (e.g., virtual and physical routers, switches, network hubs, servers, storage devices, compute devices, etc.), as needed to facilitate communication between the source endpoint node 102 and the HPC network 104, the target endpoint node 108 and the HPC network 104, and/or the trace endpoint node 110 and the HPC network 104, which are not shown to preserve clarity of the description.

Figure 3:
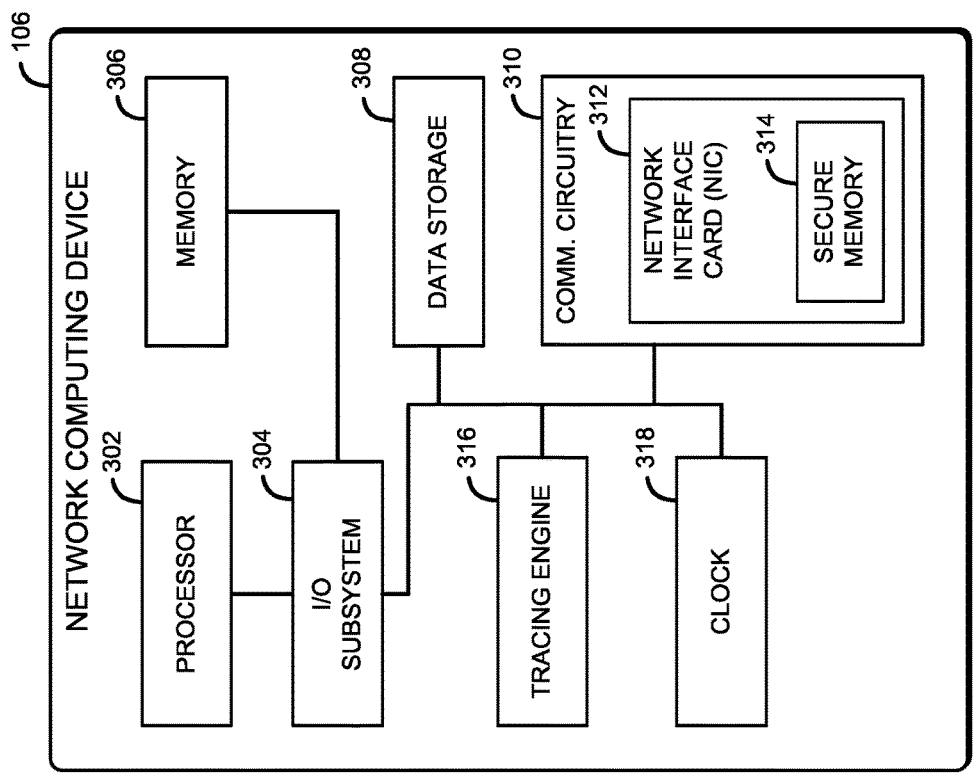
FIG. 3 is a simplified block diagram of at least one embodiment of the network computing device of the system of FIG. 1.

The network computing device 106 may be embodied as any type of network traffic processing and/or forwarding device capable of performing the functions described herein, such as, without limitation, a switch (e.g., rack-mounted, standalone, fully managed, partially managed, full-duplex, and/or half-duplex communication mode enabled, etc.), a server (e.g., stand-alone, rack-mounted, blade, etc.), a network appliance (e.g., physical or virtual), a router, a web appliance, a distributed computing system, a processor-based system, and/or a multiprocessor system. As shown in FIG. 3, similar to the illustrative source endpoint node 102 of FIG. 2, the illustrative network computing device 106 includes a processor 302, an I/O subsystem 304, a memory 306, a data storage device 308, communication circuitry 310 that includes a NIC 312 and a secure memory 314 of the NIC 312, a tracing engine 316, and a clock 318. As such, further descriptions of the like components are not repeated herein with the understanding that the description of the corresponding components provided above in regard to the illustrative source endpoint node 102 of FIG. 2 applies equally to the corresponding components of the illustrative network computing device 106 of FIG. 3.

The tracing engine 316 may be embodied as any hardware, firmware, software, or combination thereof (e.g., limited-function high-speed hardware) capable of being configured by a processor (e.g., the processor 302) of the network computing device 106 and performing the various functions described herein, such as collecting performance-relevant data (i.e., trace data) and making the performance-relevant data available for performance analysis. As described previously, the trace data may include any type of information related to network traffic travelling through the HPC network 104, such as routing information, delay information, reception/transmission queue information, decision-making information, information regarding one or more characteristics of one or more components of the network computing device 106, etc. In some embodiments, the tracing engine 316 may form a portion of the processor 302 or otherwise may be established by the processor 302. In other embodiments, the tracing engine 316 may be embodied as an independent circuit or processor (e.g., a specialized co-processor or ASIC).

The tracing engine 316 is configured to interact with hardware blocks that generate (e.g., via performance counter hardware) the trace data related to network traffic and otherwise process the network packet. Additionally, the tracing engine 316 is configured to store the generated trace data in a local trace buffer (see, e.g., the trace buffer 708 of the illustrative network computing device 106 of FIG. 7). The tracing engine 316 is further configured to retrieve at least a portion of the trace data from the trace buffer and insert the retrieved trace data into another network packet different from the network packet for which the trace data was generated. In other words, the tracing engine 316 is configured to generate a separate network packet (i.e., a trace data network packet) in which to transmit the trace data to the target endpoint node 108, the network computing device 106, or the trace endpoint node 110 out of line, or sideband.

It should be appreciated that, in some embodiments, the tracing engine 316 may be configured to generate and store trace data for more than one network packet, which may then be transmitted via a single trace data network packet. As such, processing overhead associated with the generation of the single trace data network packet can be amortized. Additionally, trace data may be time shifted, such that during a certain window of time, network traffic does not add trace data network packets, allowing for the trace data network packet to be sent outside the trace data measurement window.

Additionally, the tracing engine 316 is further configured to determine how, when, and what performance data (i.e., the trace data) to capture/forward based on one or more performance tracing settings. The performance tracing settings may be based on one or more control settings local to the network computing device 106 (e.g., a policy of the network computing device 106) or received via a network packet from the source endpoint node 102. In such embodiments in which the performance tracing settings are received from the source endpoint node 102, the performance tracing settings may be stored in one or more bits of a header field of a network packet received from the source endpoint node 102. The performance tracing settings may include any data related to performance tracing, such as whether trace data collection is enabled, a type of trace data to be collected, a size of the trace data to be collected, tagging information whether the trace data and/or tagging information should be compressed, etc. It should be further appreciated that, in some embodiments, the tracing engine 316 may be configured to insert such performance tracing settings, or controls, into the trace data network packets to be transmitted from the network computing device 106.

In some embodiments, the tracing engine 316 may be configured to include tagging information usable to reconstruct the trace into the trace data network packets at a destination endpoint node (e.g., the target endpoint node 108, the trace endpoint node 110, etc.). As described previously, the tagging information may include any data usable to identify an association of the trace data network packets with the corresponding network packets for which the trace data was collected, such as source identifying information, destination identifying information, flow identifying information, a packet sequence number, path identifying information, as well as characteristics associated with the tagged information, such as a time of interest (e.g., an ingress time, an egress time, a queued time, etc.) recorded via a timestamp. For example, the tag may be a concatenation of an identifier of the source endpoint node 102, a sequence number assigned to the network packet by the source endpoint node 102. In some embodiments, the tag may further include additional identifying information, such as a timestamp corresponding to a time of interest and/or an identifier of the target endpoint node 108.

In some embodiments, the tracing engine 316 may be additionally configured to compress the trace data (i.e., reduce the size of the trace data). To do so, in some embodiments, the tracing engine 316 may be configured to save trace data in ranges, or bins, indicating whether the trace data falls below, within, or above a particular threshold. For example, given a threshold value, a counter may be incremented corresponding to how close a value is to the threshold value. In some embodiments, the tracing engine 316 may be additionally or alternatively configured to only collect trace data for network packets received from a particular source endpoint node 102, a particular network packet flow. In another example, in some embodiments, the trace data may only be collected if the network packet spends a period of time greater than a duration threshold at the network computing device 106 (i.e., indicating a delay).

In some embodiments, the target endpoint node 108 may save at least a portion of the trace data to memory in a circular buffer (i.e., overwriting older trace data that has not been consumed). Alternatively, in some embodiments, the target endpoint node 108 may save at least a portion of the trace data until a memory buffer is filled, in which case the target endpoint node 108 stops saving in order to avoid overwriting older data contained in the memory buffer. In some embodiments, an indicator in the header of the network packet may be used to indicate which storage approach is to be implemented.

The tracing engine 316 may be configured to capture the trace data based on a trace setting level, such as may be included in the performance tracing settings. The trace setting level may be used to indicate to filter or otherwise reduce the amount and/or type of trace data being collected. For example, the trace setting level may indicate to enable performance tracing after a threshold amount of network packets has been passed through the network computing device 106. In another example, the trace setting level may indicate to enable performance tracing when at least one input buffer of the network computing device 106 is more than 50% full and disable performance tracing when all input buffers are less than 50% full.

In still another example, the trace setting level may indicate to track the number of bytes or network packets that have passed through the network computing device 106 during a particular time window and enable/disable performance tracing based on the tracked number of bytes or network packets. It should be appreciated that, in some embodiments, the tracing engine 316 may utilize a different trace setting level for one or more of the received network packets. Alternatively, in other embodiments, the tracing engine 316 may utilize the same trace setting level for all of the received network packets.

To further reduce the overhead associated with sending the trace data, in some embodiments, the tracing engine 316 may be configured to save ingress-to-egress time (i.e., a time delta) rather than absolute time. Alternatively, the tracing engine 316 may be configured to save only data that is determined to fall into a certain predetermined category. For example, the tracing engine 316 may be configured to support short and long performance trace entries (e.g., increment a counter by zero or one, increment the counter by one or two, etc.). In another example, network packets handled in a time less than a predetermined threshold duration may save trace data in short-form, while network packets handled in a time greater than a predetermined threshold duration (i.e., delayed network packets) may save trace data in long-form. In such embodiments, a counter may be saved or a change in one counter may be used to trigger saving of another counter.

Additionally or alternatively, trace data may be collected variably. For example, if one resource of the network computing device 106 could be a bottleneck or another resource of the network computing device 106 could be a bottleneck, then the tracing engine 316 may examine counters for each of the resources and collect trace data on only one of the resources, as well as a bit to indicate which resource was recorded. It should be appreciated that the network computing device 106 may be configured to collect additional other data in transit, such as various metrics of the network computing device 106, which may be stored by the tracing engine, inserted with the trace data in a network packet, and may be compressed in a similar fashion as the trace data described previously.

Similar to the compression examples of the trace data described above, in some embodiments, the tagging information in the trace data network packets may be compressed. For example, the tracing engine 316 may be configured to save an initial full timestamp and then a few bits for each microsecond time advance. In another example, the tracing engine 316 may record timestamps as sideband information, such as recording the number of network packets for which trace data has been collected at a particular interval (e.g., every five microseconds). Additionally or alternatively, the tracing engine 316 may be configured to tag the trace data according to the network packet for which the trace data was generated.

Similar to the source endpoint node 102, the target endpoint node 108 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system.

As shown in FIG. 4, the illustrative target endpoint node 108, also similar to the illustrative source endpoint node 102 of FIG. 2, includes a processor 402, an I/O subsystem 404, a memory 406, a data storage device 408, communication circuitry 410 that includes a NIC 412 and a secure memory 414 of the NIC 412, a tracing engine 416, a clock 418, and one or more peripheral devices 420. As such, further descriptions of the like components are not repeated herein with the understanding that the description of the corresponding components provided above in regard to the illustrative source endpoint node 102 of FIG. 2 applies equally to the corresponding components of the illustrative target endpoint node 108 of FIG. 4.

The tracing engine 416 of the target endpoint node 108, similar to the tracing engine 216 of the source endpoint node 102 previously described, is configured to retrieve locally stored trace data. The tracing engine 416 is further configured to extract trace data from a network packet received by the target endpoint node 108, such as may be received from the network computing device 106, and store the trace data locally. In some embodiments, the tracing engine 416 may be additionally configured to process the stored trace data and record it in a trace memory of the target endpoint node 108. Additionally or alternatively, in some embodiments, the tracing engine 416 may form a portion of the processor 402 or otherwise may be established by the processor 402. In other embodiments, the tracing engine 416 may be embodied as an independent circuit or processor (e.g., a specialized co-processor or ASIC).

It should be appreciated that the network packet may pass through a plurality of network computing devices 106, from which trace data may be transmitted to the target endpoint node 108. As such, in some embodiments, tagging information may be included with the trace data. The tagging information may include any information usable to identify the network packet for trace data reconstruction at the receiving device (e.g., the target endpoint node 108 or the trace endpoint node 110). For example, the tagging information may include a concatenation of a sender number (i.e., an identifier of the sender device) and a sequence number (e.g., as may be assigned by the source endpoint node 102 upon generated of the network packet). As a result, upon receiving the set of network packets, as may be determined by the sequence numbers, the target endpoint node 108 can reconstruct the trace (e.g., delays, re-routes, and other performance data).

Alternatively, in some embodiments, such tagging information may not be included with the trace data. In such embodiments, trace data collected and subsequently transmitted to the target endpoint node 108 may not be directly associable with other network packets, but may be associated with a group of network packets marked for performance data collection, such as over a certain period of time. Further, trace data saved at the respective network computing device 106 is typically saved in time order, which may be usable to associate received trace data with finer granularity. For example, if 4,500 traced network packets pass through a network computing device 106, the first 1,500 trace data network packets received at the target computing node are most likely associated with the first 1,500 traced network packets traced network packets.

As such, in such embodiments, the tracing engine 416 may be configured to associate blocks of received trace data network packets and compute various attributes of the blocks of received trace data network packets. Accordingly, the tracing engine 416 may be configured to observe characteristics of network performance with the attributes of each of the blocks of received trace data network packets. For example, the tracing engine 416 may compute delay values observed for each block of 1,500 trace data network packets to determine whether congestion has increased, decreased, or remained the same.

In some embodiments, limited tagging may increase the utility of the trace data, even if the tag is not enough to fully reconstruct the trace. For example, timestamp information may be used to reconstruct the trace data based on a timestamp corresponding to a recorded performance trace event of the network packets (e.g., ingress, queuing, egress, etc.) for which trace data has been recorded. As such the received trace data network packets may be grouped in time windows based on the timestamps. For example, an egress timestamp tag may be updated every five microseconds. Accordingly, trace data collected over 40 microseconds may have up to eight unique timestamp tags. As a result, the tracing engine 416 may be configured to determine network packet transmission rates, delays, etc., based on a trace reconstructed from the timestamp tags. It should be appreciated that the trace data may be offloaded to another device, such that reconstruction is not performed by the tracing engine 416 directly.

Referring again to FIG. 1, similar to the target endpoint node 108, the trace endpoint node 110 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system.

The trace endpoint node 110, also similar to the illustrative target endpoint node 108 of FIG. 4, may include a processor, an I/O subsystem, a memory, a data storage device, communication circuitry that includes a NIC and a secure memory of the NIC, a tracing engine, a clock, and one or more peripheral devices, which are not shown to preserve clarity of the description. As such, further description of the like components are not repeated herein with the understanding that the description of the corresponding components provided above in regard to the illustrative target endpoint node 108 of FIG. 4 applies equally to the corresponding components of the trace endpoint node 110. It should be appreciated that at least a portion of the trace data analysis described above as being performed by the tracing engine 416 may be additionally or alternatively performed by the trace endpoint node 110 (e.g., a tracing engine of the trace endpoint node 110), in some embodiments.

Referring now to FIG. 5, in an illustrative embodiment, the network computing device 106 establishes an environment 500 during operation. The illustrative environment 500 includes a network communication management module 510 and a performance tracing module 520. Each of the modules, logic, and other components of the environment 500 may be embodied as hardware, software, firmware, or a combination thereof. For example, each of the modules, logic, and other components of the environment 500 may form a portion of, or otherwise be established by, the processor 302, the communication circuitry 310 (e.g., the NIC 312), and/or other hardware components of the network computing device 106. As such, in some embodiments, one or more of the modules of the environment 500 may be embodied as circuitry or a collection of electrical devices (e.g., network communication management circuitry 510, performance tracing circuitry 520, etc.). It should be appreciated that the network computing device 106 may include other components, sub-components, modules, sub-modules, and/or devices commonly found in a computing device, which are not illustrated in FIG. 5 for clarity of the description.

The illustrative environment 500 of the network computing device 106 additionally includes trace data 502 and header data 504, each of which may be stored in the memory 306, the data storage device 308, and/or the secure memory 314 of the network computing device 106, and may be accessed by the various modules and/or sub-modules of the network computing device 106 described herein. As described previously, the trace data 502 may include any type of information related to the flow of network traffic, such as route information, delay information, queue information, decision-making information, etc., as well as any characteristics of one or more components of the network computing device 106 (e.g., temperature, internal buffer usage, processor usage, memory usage, etc.) that processed/forwarded the network packet. The header data 504 may include any type of information stored in a header of a network packet, such as sender information, destination information, performance tracing settings, etc.

The network communication management module 510 is configured to facilitate inbound and outbound network communications (e.g., network traffic, network packets, network flows, etc.) to and from the network computing device 106. To do so, the network communication management module 510 is configured to receive and process network packets from other computing devices (e.g., the source endpoint node 102, another network computing device 106, the target endpoint node 108, the trace endpoint node 110, etc.). Additionally, the network communication management module 510 is configured to prepare and transmit network packets to another computing device (e.g., the source endpoint node 102, another network computing device 106, the target endpoint node 108, the trace endpoint node 110, etc.). Accordingly, in some embodiments, at least a portion of the functionality of the network communication management module 510 may be performed by the communication circuitry 310, and more specifically by the NIC 312.

The performance tracing module 520 is configured to manage trace data generated by and stored local to the network computing device 106, as well as insert such trace data into a trace data network packet generated by the network computing device 106. To manage the trace data, in some embodiments, the performance tracing module 520 may include a header data extraction module 522, a trace data capture module 524, a trace data storage management module 526, and a trace data transmission queue management module 528. The header data extraction module 522 may be configured to extract header information from received network packets and store the extracted header information in the header data 504, which may be located in the secure memory 314 of the NIC 312. The trace data capture module 524 may be configured to capture trace data corresponding to a received network packet. As described previously, the trace data may include any type of information related to network traffic travelling through the HPC network 104, such as routing information, delay information, reception/transmission queue information, decision-making information, information regarding one or more characteristics of one or more components of the network computing device 106, etc.

The trace data storage management module 526 may be configured to store the captured trace data in the trace data 502, which may be located in the secure memory 314 of the NIC 312. The trace data transmission queue management module 528 may be configured to retrieve trace data (e.g., such as may be stored in the trace data 502) and insert the retrieved trace data into a trace data network packet. It should be appreciated that, in some embodiments, at least a portion of the functions of the performance tracing module 520 described herein may be performed by the tracing engine 316 described above.

Figure 6:
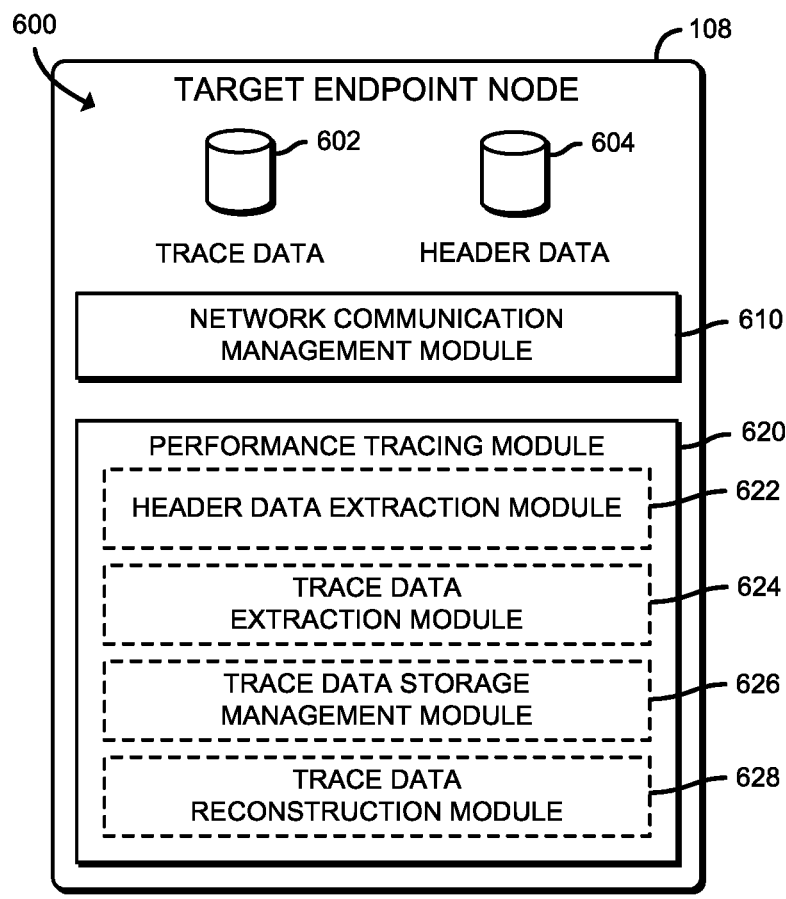
FIG. 6 is a simplified block diagram of at least one embodiment of an environment that may be established by the target endpoint node of FIG. 4.

Referring now to FIG. 6, in an illustrative embodiment, the target endpoint node 108 establishes an environment 600 during operation. The illustrative environment 600 includes a network communication management module 610 and a performance tracing module 620. Each of the modules, logic, and other components of the environment 600 may be embodied as hardware, software, firmware, or a combination thereof. For example, each of the modules, logic, and other components of the environment 600 may form a portion of, or otherwise be established by, the processor 402, the communication circuitry 410 (e.g., the NIC 412), and/or other hardware components of the target endpoint node 108. As such, in some embodiments, one or more of the modules of the environment 600 may be embodied as circuitry or a collection of electrical devices (e.g., network communication management circuitry 610, performance tracing circuitry 620, etc.). It should be appreciated that the target endpoint node 108 may include other components, sub-components, modules, sub-modules, and/or devices commonly found in a computing device, which are not illustrated in FIG. 6 for clarity of the description.

The illustrative environment 600 of the target endpoint node 108 additionally includes trace data 602 and header data 604, each of which may be stored in the memory 406, the data storage device 408, and/or the secure memory 414, and may be accessed by the various modules and/or sub-modules of the target endpoint node 108. As described previously, the trace data 602 may include any type of information related to the flow of network traffic, such as route information, delay information, queue information, decision-making information, etc., as well as any characteristics of one or more components of the source endpoint node 102 and/or the network computing device(s) 106 (e.g., temperature, internal buffer usage, processor usage, memory usage, etc.) that processed/forwarded the network packet.

The network communication management module 610, similar to the network communication management module 510 of FIG. 5, is configured to facilitate inbound and outbound network communications (e.g., network traffic, network packets, network flows, etc.) to and from the target endpoint node 108. To do so, the network communication management module 610 is configured to receive and process network packets from other computing devices (e.g., the network computing device 106). Additionally, the network communication management module 610 is configured to prepare and transmit network packets to another computing device (e.g., the network computing device 106). Accordingly, in some embodiments, at least a portion of the functionality of the network communication management module 610 may be performed by the communication circuitry 410, and more specifically by the NIC 412.

The performance tracing module 620 is configured to manage trace data generated by and/or received by the target endpoint node 108. Additionally, the performance tracing module 620 is configured to extract trace data from received network packets, store the extracted trace data local to the target endpoint node 108, and reconstruct the trace corresponding to the trace data from which performance analysis may be performed. To do so, in some embodiments, the performance tracing module 620 may include a header data extraction module 622, a trace data extraction module 624, a trace data storage management module 626, and a trace data reconstruction module 628.

The header data extraction module 622 may be configured to extract header information from received trace data network packets and store the extracted header information in the header data 604, which may be located in the secure memory 414 of the NIC 412. In some embodiments in which a tag is incorporated into the header of the network packet, the header data extraction module 622 may be additionally configured to determine which field corresponds to the tag and store the tag with the trace data extracted from the corresponding trace data network packet. The trace data extraction module 624 may be configured to extract the trace data from the received trace data network packets.

The trace data storage management module 626 may be configured to store the extracted trace data. It should be appreciated that the trace data storage management module 626 may be configured to store the extracted trace data based on one or more performance tracing settings, such as by binning the trace data based on a characteristic of the network packet for which the trace data was generated. The trace data reconstruction module 628 may be configured to reconstruct the trace data. It should be appreciated that the trace data reconstruction module 628 may be configured to reconstruct the trace data based on an extracted tag of the trace data network packet, as described above. It should be further appreciated that, in some embodiments, at least a portion of the functions of the performance tracing module 620 described herein may be performed by the tracing engine 416 of the target endpoint node 108 described above.

In some embodiments as described above, the trace data may be transmitted to the trace endpoint node 110 rather than the target endpoint node 108. Accordingly, it should be appreciated that, in such embodiments, the trace endpoint node may include a performance tracing module capable of performing the functions as described above for the performance tracing module 620 of the illustrative target endpoint node 108 of FIG. 6.

Figure 7:
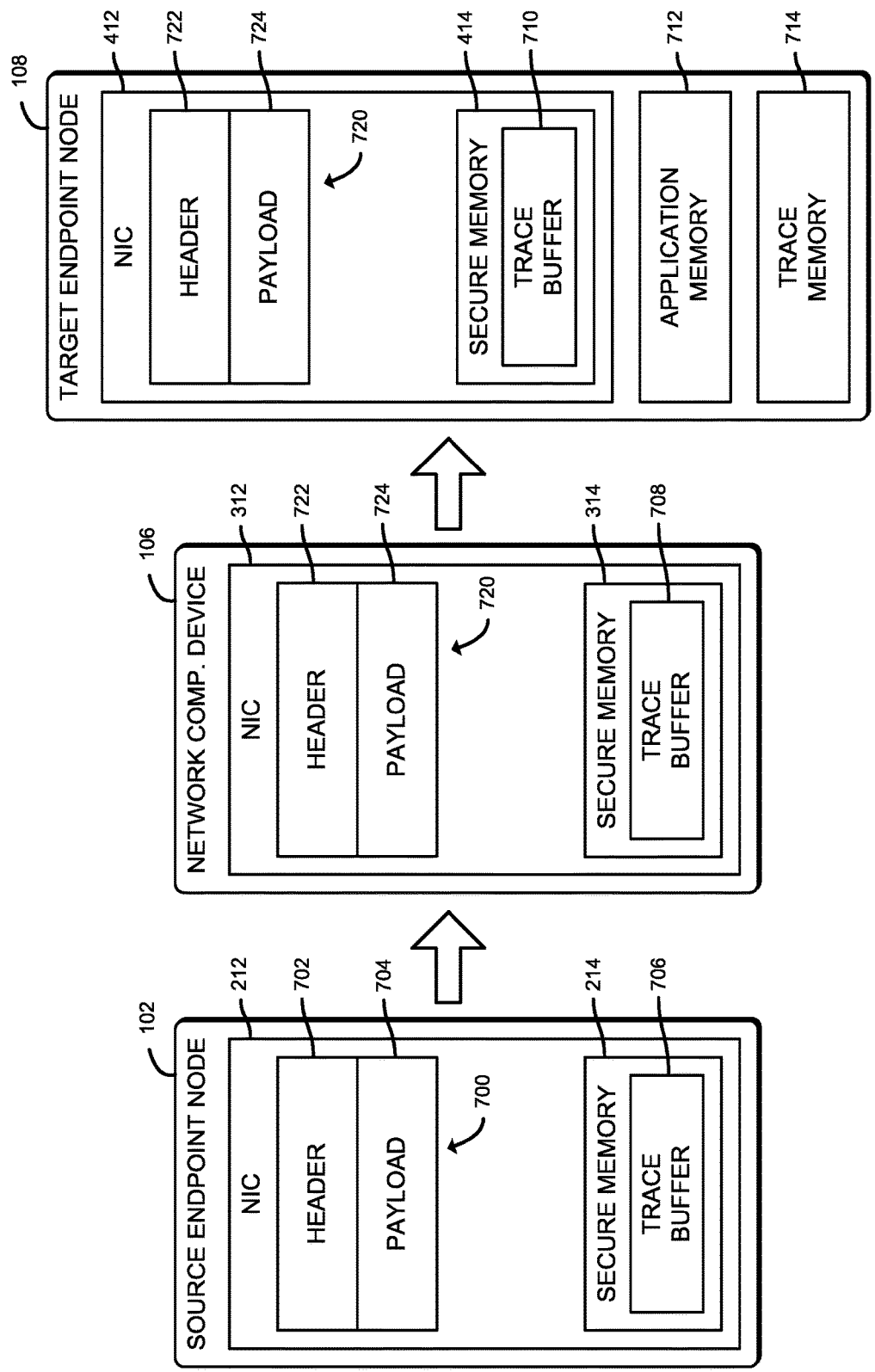
FIG. 7 is a simplified block diagram of at least one embodiment of a network packet flow illustrating trace data being captured and forwarded through the network of the system of FIG. 1.

Referring now to FIG. 7, in use, the source endpoint node 102 is configured to generate a network packet 700, such as in response to an application presently being executed on the source endpoint node 102. The network packet 700 may include a header portion 702 and a payload portion 704. The source endpoint node 102 is further configured to transmit the network packet 700 to the network computing device 106. In some embodiments, the source endpoint node 102 may be configured to generate trace data related to the network packet 700 and store the generated trace data in a trace buffer 706 in the secure memory 214 of the NIC 212. It should be appreciated that, in such embodiments, the source endpoint node 102 may be additionally configured to generate a trace data network packet (see, e.g., the trace data network packet 720) that includes at least a portion of the trace data from the trace buffer 706. Further, in such embodiments, the source endpoint node 102 may be configured to transmit the trace data network packet in a similar fashion described for the trace data network packet 720 generated by the network computing device 106 described below. Alternatively, in an embodiment in which the source endpoint node 102 includes trace memory analogous to the target endpoint node 108 (i.e., the trace memory 714 of FIG. 7), the trace data may be saved to the trace memory for processing by higher-level software running on the source endpoint node 102.

The network computing device 106 is configured to process/forward the network packet 700, generate trace data corresponding to the network packet 700 received from the source endpoint node 102, and store the generated trace data to a trace buffer 708 in the secure memory 314 local to the NIC 312. As described previously, the trace data generated by the network computing device 106 may include any type of information related to the network packet 700 travelling through the HPC network 104, such as transit information, queue information, credit availability, error rate counters, other event counters (e.g., low bits of the event counters), routing decision information (e.g., a selected routing path), information relating to a detected cause of delay (e.g., delayed due to credit exhaustion, port availability bottleneck, etc.), and/or characteristic(s) of components of the network computing device 106 (e.g., a temperature, an internal buffer usage information, a processor usage percentage, a memory usage percentage, etc.).

In some embodiments, the trace data may be stored in a pair format that includes an identifier of the network computing device 106 and a time of interest or other information related to the network packet 700 travelling through the HPC network 104 as described previously. As described previously, the time of interest may include a time of ingress of the network packet 700 at the network computing device 106, a time for which the network packet 700 was queued at the network computing device 106, a time of egress of the network packet 700 from the network computing device 106, and the like. The network computing device 106 is further configured to forward the network packet 700 to either another network computing device 106 or the target endpoint node 108, depending on a determined flow of the network packet 700, for example.

The network computing device 106 is further configured to generate a trace data network packet 720 subsequent to receiving, processing, and forwarding the network packet 700 (i.e., sideband), as well as generating the trace data corresponding thereto. Additionally, the network computing device 106 is configured to transmit the trace data network packet 720 to the target endpoint node 108 for trace reconstruction. Accordingly, the trace data network packet 720 may include tagging information, which may be stored in the header portion 722 or the payload portion 724 of the trace data network packet 720. In some embodiments, the network computing device 106 may be configured to insert an indicator into the trace data network packet 720 that indicates the trace data network packet 720 includes trace data. Additionally or alternatively, the network computing device 106 may be configured to insert an indicator into the trace data network packet that indicates which performance tracing settings were used and/or are to be used to generate/collect the trace data.

In some embodiments in which the source endpoint node 102 is configured to generate a trace data network packet, the network computing device 106 may be configured to forward the trace data network packet received from the source endpoint node 102 and/or extract the trace data from the trace data network packet. In such embodiments in which the network computing device 106 is configured to extract the trace data, the extracted trace data may be stored in the trace buffer 708.

As described previously, in some embodiments, the trace data network packet 720 may be forwarded to the trace endpoint node 110 rather than the target endpoint node 108. It should be appreciated that, in such embodiments, the trace endpoint node 110 may be configured to perform the functions of the illustrative target endpoint node 108 of FIG. 7, as described herein.

The target endpoint node 108 is configured to receive the trace data network packet 720 from the network computing device 106, extract the trace data from the trace data network packet 720 (e.g., from the payload portion 724 of the network packet), and store the extracted trace data to a trace buffer 710 in the secure memory 414 local to the NIC 412. Additionally, the target endpoint node 108 is configured to store the trace data from the trace buffer 710 to a trace memory 714 (i.e., a stable storage location) external to the NIC 412. It should be appreciated that storing the trace data to the trace memory 714 frees at least a portion of the trace memory 714, which may allow for additional trace data to be saved. The target endpoint node 108 is further configured to receive the network packet 700, extract the payload portion 704 of the network packet 700, and store the extracted payload into an application memory 712 external to the NIC 412.

Figure 8:
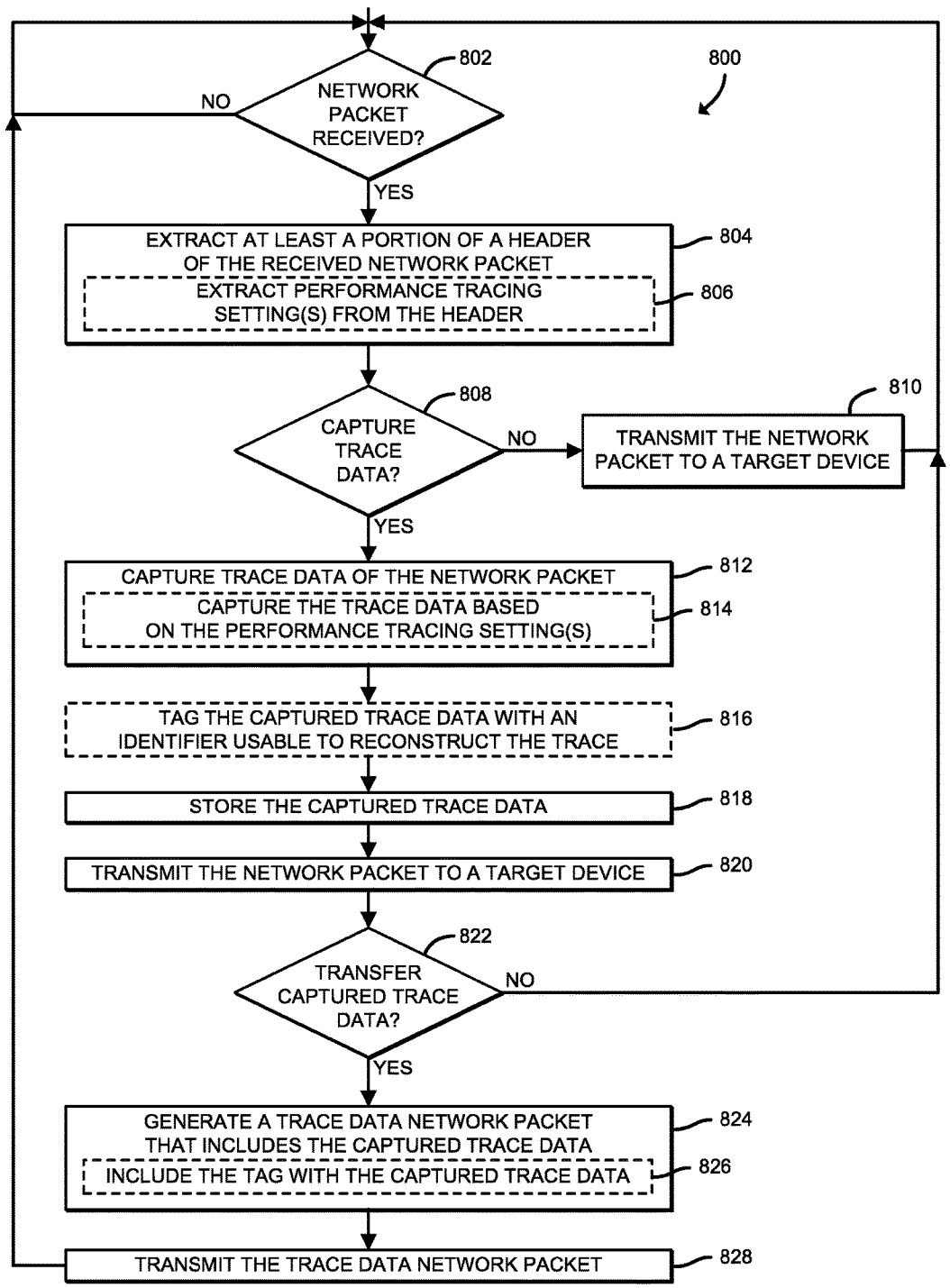
FIG. 8 is a simplified flow diagram of at least one embodiment of a method for tracing performance of network traffic through a network that may be executed by the network computing device of FIGS. 3 and 5.

Referring now to FIG. 8, in use, the network computing device 106 may execute a method 800 for tracing performance of network traffic through a network (e.g., the HPC network 104). It should be appreciated that at least a portion of the method 800 may be executed by the NIC 312 of the network computing device 106. It should be further appreciated that, in some embodiments, the method 800 may be embodied as various instructions stored on a computer-readable media, which may be executed by the processor 302, the NIC 312, and/or other components of the network computing device 106 to cause the network computing device 106 to perform the method 800. The computer-readable media may be embodied as any type of media capable of being read by the network computing device 106 including, but not limited to, the memory 306, the data storage device 308, the secure memory 314 of the NIC 312, other memory or data storage devices of the network computing device 106, portable media readable by a peripheral device of the network computing device 106, and/or other media.

The method 800 begins with block 802, in which the network computing device 106 determines whether a network packet has been received, such as may be received from the source endpoint node 102 or another network computing device 106. If so, the method 800 advances to block 804, wherein the network computing device 106 extracts one or more header fields from the network packet received in block 802. In some embodiments, in block 806, the network computing device 106 extracts one or more performance tracing settings from the header of the received network packet. As described previously, the performance tracing settings may include any data related to performance tracing, such as whether trace data collection is enabled, a type of trace data to be collected, a size of the trace data to be collected, tagging information whether the trace data and/or tagging information should be compressed, etc.

In block 808, the network computing device 106 determines whether to capture trace data (i.e., whether performance tracing is enabled). As described previously, a performance tracing setting may be used by the network computing device 106 to determine whether performance tracing is enabled. If performance tracing is not enabled, the method 800 branches to block 810, in which the network computing device 106 transmits the received network packet to a target device (e.g., another network computing device 106, the target endpoint node 108, etc.) before the method 800 returns to block 802 to determine whether another network packet has been received. Otherwise, if performance tracing is enabled, the method advances to block 812.

In block 812, the network computing device 106 captures trace data of the network packet. In other words, the network computing device 106 captures trace data of the network packet as it is received, processed, forwarded through the network computing device 106). As described previously, the trace data may include any type of information related to network traffic travelling through the network computing device 106, such as a timestamp recording a time of interest (e.g., a time of ingress, a time at which the network packet was queued, a time of egress, etc.), routing information (e.g., a source identifier, a destination identifier, etc.), delay information (e.g., an amount of time between queuing and egress, a number of cycles between ingress and egress, etc.), decision-making information (e.g., why the network packet was forwarded to the network computing device 106), information regarding one or more characteristics (e.g., a temperature, an internal buffer usage, a processor usage percentage, a memory usage, etc.) of one or more components of the network computing device 106, etc.

In some embodiments, in block 814, the network computing device 106 may capture the trace data based on the one or more performance tracing settings. As also described previously, the performance tracing settings may include any data related to performance tracing, such as whether trace data collection is enabled, a type of trace data to be collected, a size of the trace data to be collected, tagging information whether the trace data and/or tagging information should be compressed, etc. In some embodiments, in block 816, the network computing device 106 may tag the captured trace data with an identifier usable to reconstruct the trace at the target endpoint node 108 or the trace endpoint node 110, depending on the embodiment.

In block 818, the network computing device 106 stores the trace data captured in block 812. In block 820, the network computing device 106 transmits the received network packet to a target computing device (e.g., the target endpoint node 108 or the trace endpoint node 110). In block 822, the network computing device 106 determines whether to transfer the captured trace data. If not, the method 800 loops back to block 802 to determine whether to whether another network packet was received; otherwise, the method 800 advances to block 824.

In block 824, the network computing device 106 generates a trace data network packet that includes at least a portion the trace data captured for the received network packet. It should be appreciated that, in some embodiments, the captured trace data may be compressed, such as may be performed using one or more of the compression techniques described above and/or based on the performance tracing settings. In some embodiments, in block 826, the network computing device 106 includes the tag in the trace data network packet. In block 828, the network computing device 106 transmits the trace data network packet to a target computing device (e.g., the target endpoint node 108 or the trace endpoint node 110).

Figure 9:
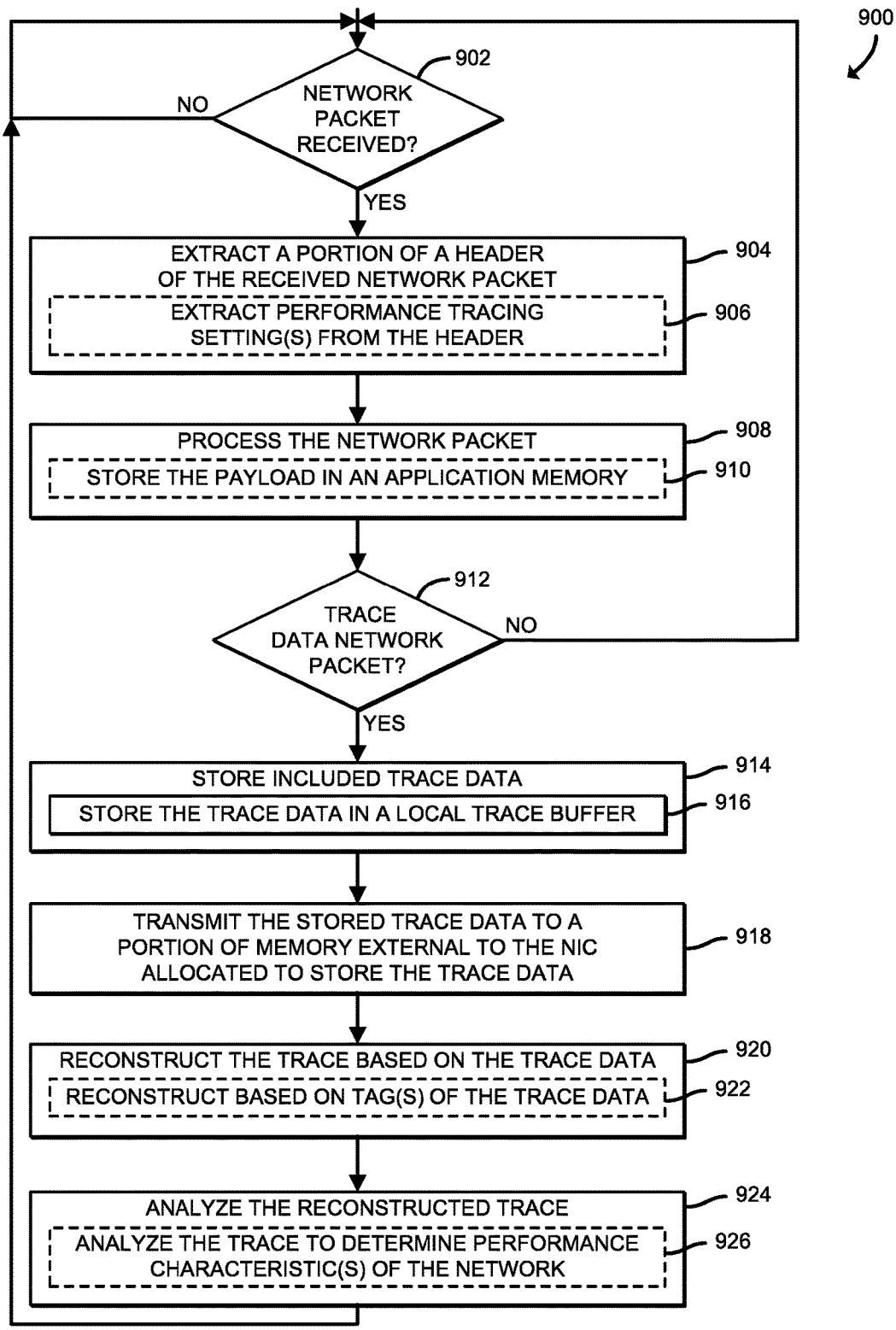
FIG. 9 is a simplified flow diagram of at least one embodiment of a method for tracing performance of network traffic through a network that may be executed by the target endpoint node of FIGS. 4 and 6.

Referring now to FIG. 9, in use, the target endpoint node 108 may execute a method 900 for tracing performance of network traffic through a network (e.g., the HPC network 104). It should be appreciated that at least a portion of the method 900 may be executed by the NIC 412 of the target endpoint node 108. It should be further appreciated that, in some embodiments, the method 900 may be embodied as various instructions stored on a computer-readable media, which may be executed by the processor 402, the NIC 412, and/or other components of the target endpoint node 108 to cause the target endpoint node 108 to perform the method 900. The computer-readable media may be embodied as any type of media capable of being read by the target endpoint node 108 including, but not limited to, the memory 406, the data storage device 408, the secure memory 414 of the NIC 412, other memory or data storage devices of the target endpoint node 108, portable media readable by a peripheral device of the target endpoint node 108, and/or other media.

The method 900 begins with block 902, in which the target endpoint node 108 determines whether a network packet has been received, such as may be received from the network computing device 106. If so, the method 900 advances to block 904, in which the target endpoint node 108 extracts a portion of the header of the received network packet. In some embodiments, in block 906, the target endpoint node 108 extracts one or more performance tracing settings from the header of the network packet. In block 908, the target endpoint node 108 processes the received network packet. In block 912, the target endpoint node 108 may store the payload of the network packet in a portion of memory allocated to application data (e.g., application memory).

In block 912, the target endpoint node 108 determines whether the network packet received in block 902 corresponds to a trace data network packet, such as may be determined based on the contents of a predetermined header field of the received network packet. In some embodiments, the determination may be based on the one or more performance tracing settings extracted from the header of the network packet in block 906.

If the network packet received in block 902 does not correspond to a trace data network packet, the method 900 returns to block 902, in which the target endpoint node 108 determines whether another network packet was received. Otherwise, if the network packet received in block 902 corresponds to a trace data network packet, the method 900 advances to block 914, in which the target endpoint node 108 stores the included trace data. In block 916, the target endpoint node 108 stores the included trace data in a trace buffer (e.g., the trace buffer 710 of FIG. 7) local to the NIC 412 of the target endpoint node 108. In block 918, the target endpoint node 108 transmits the stored trace data to a portion of memory external to the NIC 412 that has been allocated to store the trace data, such as the trace memory 714 of FIG. 7. It should be appreciated that, in some embodiments, the trace data is stored and only transmitted when a certain condition is met (e.g., the last network packet of a sequence has been received).

In block 920, the target endpoint node 108 reconstructs the trace based on the trace data. It should be appreciated that, in some embodiments, reconstruction of the trace may not occur until another event, such as completion of an application being run on the target endpoint node 108. In some embodiments, in block 922, the target endpoint node 108 may reconstruct the trace based on the tags of the trace data, as described previously. In block 924, the target endpoint node 108 analyzes the reconstructed trace. For example, in block 926, the target endpoint node 108 analyzes the reconstructed trace to determine one or more performance characteristics of the HPC network 104.

The performance characteristics may include a detected issue, such as a delay, queue fullness, duration of time one or more network packet spend at a respective network computing device 106, and/or any other data related to the performance of the network traffic through the HPC network 104. As such, based on the performance characteristics, various issues of HPC network 104 may be detected and the network computing device(s) 106 responsible for the detected issues may be identified. As noted above, the reconstruction of the trace and further analysis may be offloaded to another computing device. In other words, in some embodiments, the trace reconstruction and analysis may not be performed by the target endpoint node 108.

EXAMPLES

Illustrative examples of the technologies disclosed herein are provided below. An embodiment of the technologies may include any one or more, and any combination of, the examples described below.

Example 1 includes a network computing device for tracing network performance, the network computing device comprising one or more processors; and one or more data storage devices having stored therein a plurality of instructions that, when executed by the one or more processors, cause the network computing device to receive a network packet from a source endpoint node; process the received network packet; capture trace data corresponding to the network packet as it is processed by the network computing device; transmit the received network packet to a target endpoint node; generate, subsequent to having transmitted the received network packet, a trace data network packet that includes at least a portion of the captured trace data, wherein the at least a portion of the captured trace data included in the trace data network packet is usable by a destination endpoint node to monitor performance of the network; and transmit the trace data network packet to the destination endpoint node.

Example 2 includes the subject matter of Example 1, and wherein the plurality of instructions further cause the network computing device to insert tagging information into the trace data network packet, wherein the tagging information is usable by the destination endpoint node to reconstruct a trace corresponding to the received network packet through the network.

Example 3 includes the subject matter of any of Examples 1 and 2, and wherein the tagging information includes at least one of source identifying information, destination identifying information, flow identifying information, path identifying information, a packet sequence number, and a time of interest.

Example 4 includes the subject matter of any of Examples 1-3, and wherein the time of interest includes at least one of a timestamp corresponding to an ingress time, a timestamp corresponding to an egress time, a timestamp corresponding to a queued time.

Example 5 includes the subject matter of any of Examples 1-4, and wherein the plurality of instructions further cause the network computing device to store the captured trace data to a trace buffer of the network computing device, wherein to generate the trace data network packet that includes at least a portion of the captured trace data comprises to (i) retrieve the at least a portion of the captured trace data and (ii) insert the retrieved portion of the captured trace data into the trace data network packet.

Example 6 includes the subject matter of any of Examples 1-5, and wherein the network packet includes a header, wherein to determine the trace data of the network packet to be captured comprises to determine the trace data based on a retrieved portion of the header of the network packet.

Example 7 includes the subject matter of any of Examples 1-6, and wherein to determine the trace data of the network packet to be captured comprises to determine the trace data based on a predetermined threshold.

Example 8 includes the subject matter of any of Examples 1-7, and wherein to determine the trace data of the network packet based on the predetermined threshold comprises to determine the trace data of the network packet based on at least one of an identifier associated with the network packet, a present usage percentage of a trace buffer, a duration of time, a time window, a number of network packets received, and a size of the network packet.

Example 9 includes the subject matter of any of Examples 1-8, and wherein the plurality of instructions further cause the network computing device to compress the trace data based on at least one of a predetermined threshold and a tag associated with the trace data.

Example 10 includes the subject matter of any of Examples 1-9, and wherein to capture the trace data comprises to at least one of capture the trace data subsequent to a predetermined number of network packets having been received by the network computing device, capture the trace data at a trace buffer of the network computing device until a usage percentage exceeds a predetermined usage threshold, increment a counter of the network computing device, and compare a value associated with the network packet against a predetermined threshold.

Example 11 includes the subject matter of any of Examples 1-10, and wherein the destination endpoint node comprises one of a trace endpoint node or a target endpoint node.

Example 12 includes the subject matter of any of Examples 1-11, and wherein the plurality of instructions further cause the network computing device to determine one or more performance tracing settings of the network packet, wherein to capture the trace data corresponding to the network packet comprises to capture the trace data based on the one or more performance tracing settings of the network packet.

Example 13 includes the subject matter of any of Examples 1-12, and wherein the one or more performance tracing settings includes at least one of an indication that indicates whether trace data collection is enabled, a type of the trace data to be collected, a size of the trace data to be collected, an indication whether to include tagging information with the trace data network packet, a type of the tagging information with which to tag the trace data network packet, and an indication that indicates whether to compress the trace data.

Example 14 includes a method for tracing network performance, the method comprising receiving, by a network computing device, a network packet from a source endpoint node; processing, by the network computing device, the received network packet; capturing, by the network computing device, trace data corresponding to the network packet as it is processed by the network computing device; transmitting, by the network computing device, the received network packet to a target endpoint node; generating, by the network computing device and subsequent to transmitting the received network packet, a trace data network packet that includes at least a portion of the captured trace data, wherein the at least a portion of the captured trace data included in the trace data network packet is usable by a destination endpoint node to monitor performance of the network; and transmitting, by the network computing device, the trace data network packet to the destination endpoint node.

Example 15 includes the subject matter of Examples 14, and further comprising inserting, by the network computing device, tagging information into the trace data network packet, wherein the tagging information is usable by the destination endpoint node to reconstruct a trace corresponding to the received network packet through the network.

Example 16 includes the subject matter of any of Examples 14 and 15, and wherein inserting the tagging information comprises inserting at least one of source identifying information, destination identifying information, flow identifying information, path identifying information, a packet sequence number, and a time of interest.

Example 17 includes the subject matter of any of Examples 14-16, and wherein inserting the time of interest comprises inserting at least one of a timestamp corresponding to an ingress time, a timestamp corresponding to an egress time, a timestamp corresponding to a queued time.

Example 18 includes the subject matter of any of Examples 14-17, and further including storing, by the network computing device, the captured trace data to a trace buffer of the network computing device, wherein generating the trace data network packet that includes at least a portion of the captured trace data comprises (i) retrieving the at least a portion of the captured trace data and (ii) inserting the retrieved portion of the captured trace data into the trace data network packet.

Example 19 includes the subject matter of any of Examples 14-18, and wherein the network packet includes a header, and wherein determining the trace data of the network packet to be captured comprises determining the trace data based on a retrieved portion of the header of the network packet.

Example 20 includes the subject matter of any of Examples 14-19, and wherein determining the trace data of the network packet to be captured comprises determining the trace data based on a predetermined threshold.

Example 21 includes the subject matter of any of Examples 14-20, and wherein determining the trace data of the network packet based on the predetermined threshold comprises determining the trace data of the network packet based on at least one of an identifier associated with the network packet, a present usage percentage of a trace buffer, a duration of time, a time window, a number of network packets received, and a size of the network packet.

Example 22 includes the subject matter of any of Examples 14-21, and further including compressing, by the network computing device, the trace data based on at least one of a predetermined threshold and a tag associated with the trace data.

Example 23 includes the subject matter of any of Examples 14-22, and wherein capturing the trace data comprises at least one of capturing the trace data subsequent to a predetermined number of network packets having been received by the network computing device, capturing the trace data at a trace buffer of the network computing device until a usage percentage exceeds a predetermined usage threshold, incrementing a counter of the network computing device, and comparing a value associated with the network packet against a predetermined threshold.

Example 24 includes the subject matter of any of Examples 14-23, and wherein transmitting the trace data network packet to the destination endpoint node comprises transmitting the trace data network packet to one of a trace endpoint node or a target endpoint node.

Example 25 includes the subject matter of any of Examples 14-24, and further including determining one or more performance tracing settings of the network packet, wherein capturing the trace data corresponding to the network packet comprises capturing the trace data based on the one or more performance tracing settings of the network packet.

Example 26 includes the subject matter of any of Examples 14-25, and wherein determining the one or more performance tracing settings comprises determining at least one of an indication that indicates whether trace data collection is enabled, a type of the trace data to be collected, a size of the trace data to be collected, an indication whether to include tagging information with the trace data network packet, a type of the tagging information with which to tag the trace data network packet, and an indication that indicates whether to compress the trace data.

Example 27 includes a network computing device comprising a processor; and a memory having stored therein a plurality of instructions that when executed by the processor cause the network computing device to perform the method of any of Examples 14-26.

Example 28 includes one or more machine readable storage media comprising a plurality of instructions stored thereon that in response to being executed result in a network computing device performing the method of any of Examples 14-26.

Example 29 includes a network computing device for tracing network performance, the network computing device comprising network communication management circuitry to (i) receive a network packet from a source endpoint node and (ii) process the received network packet; and performance tracing circuitry to capture trace data corresponding to the network packet as it is processed by the network computing device, wherein the network communication management circuitry is further to transmit the received network packet to a target endpoint node, wherein the performance tracing circuitry is further to generate, subsequent to having transmitted the received network packet, a trace data network packet that includes at least a portion of the captured trace data, wherein the at least a portion of the captured trace data included in the trace data network packet is usable by a destination endpoint node to monitor performance of the network, and wherein the network communication management circuitry is further to transmit the trace data network packet to the destination endpoint node.

Example 30 includes the subject matter of Example 29, and wherein the performance tracing circuitry is further to insert tagging information into the trace data network packet, wherein the tagging information is usable by the destination endpoint node to reconstruct a trace corresponding to the received network packet through the network.

Example 31 includes the subject matter of any of Examples 29 and 30, and wherein the tagging information includes at least one of source identifying information, destination identifying information, flow identifying information, path identifying information, a packet sequence number, and a time of interest.

Example 32 includes the subject matter of any of Examples 29-31, and wherein the time of interest includes at least one of a timestamp corresponding to an ingress time, a timestamp corresponding to an egress time, a timestamp corresponding to a queued time.

Example 33 includes the subject matter of any of Examples 29-32, and wherein the performance tracing circuitry is further to store the captured trace data to a trace buffer of the network computing device, wherein to generate the trace data network packet that includes at least a portion of the captured trace data comprises to (i) retrieve the at least a portion of the captured trace data and (ii) insert the retrieved portion of the captured trace data into the trace data network packet.

Example 34 includes the subject matter of any of Examples 29-33, and wherein the network packet includes a header, wherein to determine the trace data of the network packet to be captured comprises to determine the trace data based on a retrieved portion of the header of the network packet.

Example 35 includes the subject matter of any of Examples 29-34, and wherein to determine the trace data of the network packet to be captured comprises to determine the trace data based on a predetermined threshold.

Example 36 includes the subject matter of any of Examples 29-35, and wherein to determine the trace data of the network packet based on the predetermined threshold comprises to determine the trace data of the network packet based on at least one of an identifier associated with the network packet, a present usage percentage of a trace buffer, a duration of time, a time window, a number of network packets received, and a size of the network packet.

Example 37 includes the subject matter of any of Examples 29-36, and wherein the performance tracing circuitry is further to compress the trace data based on at least one of a predetermined threshold and a tag associated with the trace data.

Example 38 includes the subject matter of any of Examples 29-37, and wherein to capture the trace data comprises to at least one of capture the trace data subsequent to a predetermined number of network packets having been received by the network computing device, capture the trace data at a trace buffer of the network computing device until a usage percentage exceeds a predetermined usage threshold, increment a counter of the network computing device, and compare a value associated with the network packet against a predetermined threshold.

Example 39 includes the subject matter of any of Examples 29-38, and wherein the destination endpoint node comprises one of a trace endpoint node or a target endpoint node.

Example 40 includes the subject matter of any of Examples 29-39, and wherein the performance tracing circuitry is further to determine one or more performance tracing settings of the network packet, wherein to capture the trace data corresponding to the network packet comprises to capture the trace data based on the one or more performance tracing settings of the network packet.

Example 41 includes the subject matter of any of Examples 29-40, and wherein the one or more performance tracing settings includes at least one of an indication that indicates whether trace data collection is enabled, a type of the trace data to be collected, a size of the trace data to be collected, an indication whether to include tagging information with the trace data network packet, a type of the tagging information with which to tag the trace data network packet, and an indication that indicates whether to compress the trace data.

Example 42 includes a network computing device for tracing network performance, the network computing device comprising network communication management circuitry to (i) receive a network packet from a source endpoint node and (ii) process the received network packet; and means for capturing trace data corresponding to the network packet as it is processed by the network computing device, wherein the network communication management circuitry is further to transmit the received network packet to a target endpoint node, and further comprising means for generating, subsequent to transmitting the received network packet, a trace data network packet that includes at least a portion of the captured trace data, wherein the at least a portion of the captured trace data included in the trace data network packet is usable by a destination endpoint node to monitor performance of the network, wherein the network communication management circuitry is further to transmit the trace data network packet to the destination endpoint node.

Example 43 includes the subject matter of Example 42, and further including means for inserting tagging information into the trace data network packet, wherein the tagging information is usable by the destination endpoint node to reconstruct a trace corresponding to the received network packet through the network.

Example 44 includes the subject matter of any of Examples 42 and 43, and wherein the means for inserting the tagging information comprises means for inserting at least one of source identifying information, destination identifying information, flow identifying information, path identifying information, a packet sequence number, and a time of interest.

Example 45 includes the subject matter of any of Examples 42-44, and wherein the means for inserting the time of interest comprises means for inserting at least one of a timestamp corresponding to an ingress time, a timestamp corresponding to an egress time, a timestamp corresponding to a queued time.

Example 46 includes the subject matter of any of Examples 42-45, and further including means for storing the captured trace data to a trace buffer of the network computing device, wherein the means for generating the trace data network packet that includes at least a portion of the captured trace data comprises means for (i) retrieving the at least a portion of the captured trace data and (ii) inserting the retrieved portion of the captured trace data into the trace data network packet.

Example 47 includes the subject matter of any of Examples 42-46, and wherein the network packet includes a header, and wherein determining the trace data of the network packet to be captured comprises determining the trace data based on a retrieved portion of the header of the network packet.

Example 48 includes the subject matter of any of Examples 42-47, and wherein the means for determining the trace data of the network packet to be captured comprises means for determining the trace data based on a predetermined threshold.

Example 49 includes the subject matter of any of Examples 42-48, and wherein the means for determining the trace data of the network packet based on the predetermined threshold comprises means for determining the trace data of the network packet based on at least one of an identifier associated with the network packet, a present usage percentage of a trace buffer, a duration of time, a time window, a number of network packets received, and a size of the network packet.

Example 50 includes the subject matter of any of Examples 42-49, and further including means for compressing the trace data based on at least one of a predetermined threshold and a tag associated with the trace data.

Example 51 includes the subject matter of any of Examples 42-50, and wherein the means for capturing the trace data comprises at least one of means for capturing the trace data subsequent to a predetermined number of network packets having been received by the network computing device, means for capturing the trace data at a trace buffer of the network computing device until a usage percentage exceeds a predetermined usage threshold, means for incrementing a counter of the network computing device, and means for comparing a value associated with the network packet against a predetermined threshold.

Example 52 includes the subject matter of any of Examples 42-51, and wherein the means for transmitting the trace data network packet to the destination endpoint node comprises means for transmitting the trace data network packet to one of a trace endpoint node or a target endpoint node.

Example 53 includes the subject matter of any of Examples 42-52, and further including means for determining one or more performance tracing settings of the network packet, wherein the means for capturing the trace data corresponding to the network packet comprises means for capturing the trace data based on the one or more performance tracing settings of the network packet.

Example 54 includes the subject matter of any of Examples 42-53, and wherein the means for determining the one or more performance tracing settings comprises means for determining at least one of an indication that indicates whether trace data collection is enabled, a type of the trace data to be collected, a size of the trace data to be collected, an indication whether to include tagging information with the trace data network packet, a type of the tagging information with which to tag the trace data network packet, and an indication that indicates whether to compress the trace data.

The invention claimed is:

1. A network computing device for tracing network performance, the network computing device comprising:
one or more processors; and
one or more data storage devices having stored therein a plurality of instructions that, when executed by the one or more processors, cause the network computing device to:
receive a network packet generated by a source endpoint node;
process the received network packet;
capture trace data corresponding to the network packet as it is processed by the network computing device, wherein the trace data includes one or more characteristics of one or more components of the network computing device;
transmit the received network packet towards a target endpoint node;
generate, subsequent to having transmitted the received network packet, a trace data network packet that includes at least a portion of the captured trace data, wherein the at least a portion of the captured trace data included in the trace data network packet is usable by a destination endpoint node to monitor performance of the network; and
transmit the trace data network packet to the destination endpoint node.

2. The network computing device of claim 1, wherein the plurality of instructions further cause the network computing device to insert tagging information into the trace data network packet, wherein the tagging information is usable by the destination endpoint node to reconstruct a trace corresponding to the received network packet through the network.

3. The network computing device of claim 2, wherein the tagging information includes at least one of source identifying information, destination identifying information, flow identifying information, path identifying information, a packet sequence number, and a time of interest.

4. The network computing device of claim 3, wherein the time of interest includes at least one of a timestamp corresponding to an ingress time, a timestamp corresponding to an egress time, and a timestamp corresponding to a queued time.

5. The network computing device of claim 1, wherein the plurality of instructions further cause the network computing device to store the captured trace data to a trace buffer of the network computing device, wherein to generate the trace data network packet that includes at least a portion of the captured trace data comprises to (i) retrieve the at least a portion of the captured trace data and (ii) insert the retrieved portion of the captured trace data into the trace data network packet.

6. The network computing device of claim 1, wherein the network packet includes a header, wherein to determine the trace data of the network packet to be captured comprises to determine the trace data based on a retrieved portion of the header of the network packet.

7. The network computing device of claim 1, wherein to determine the trace data of the network packet to be captured comprises to determine the trace data based on a predetermined threshold, and wherein the predetermined threshold comprises at least one of an identifier associated with the network packet, a present usage percentage of a trace buffer, a duration of time, a time window, a number of network packets received, and a size of the network packet.

8. The network computing device of claim 1, wherein the plurality of instructions further cause the network computing device to compress the trace data based on at least one of a predetermined threshold and a tag associated with the trace data.

9. The network computing device of claim 1, wherein to capture the trace data comprises to at least one of capture the trace data subsequent to a predetermined number of network packets having been received by the network computing device, capture the trace data at a trace buffer of the network computing device until a usage percentage exceeds a predetermined usage threshold, increment a counter of the network computing device, and compare a value associated with the network packet against a predetermined threshold.

10. The network computing device of claim 1, wherein the plurality of instructions further cause the network computing device to determine one or more performance tracing settings of the network packet, wherein to capture the trace data corresponding to the network packet comprises to capture the trace data based on the one or more performance tracing settings of the network packet.

11. The network computing device of claim 10, wherein the one or more performance tracing settings includes at least one of an indication that indicates whether trace data collection is enabled, a type of the trace data to be collected, a size of the trace data to be collected, an indication whether to include tagging information with the trace data network packet, a type of the tagging information with which to tag the trace data network packet, and an indication that indicates whether to compress the trace data.

12. One or more non-transitory, computer-readable storage media comprising a plurality of instructions stored thereon that in response to being executed cause a network computing device to:
receive a network packet generated by a source endpoint node;
process the received network packet;
capture trace data corresponding to the network packet as it is processed by the network computing device, wherein the trace data includes one or more characteristics of one or more components of the network computing device;
transmit the received network packet to a target endpoint node;
generate, subsequent to having transmitted the received network packet, a trace data network packet that includes at least a portion of the captured trace data, wherein the at least a portion of the captured trace data included in the trace data network packet is usable by a destination endpoint node to monitor performance of the network; and
transmit the trace data network packet to the destination endpoint node.

13. The one or more non-transitory, computer-readable storage media of claim 12, wherein the plurality of instructions further cause the network computing device to insert tagging information into the trace data network packet, wherein the tagging information is usable by the destination endpoint node to reconstruct a trace corresponding to the received network packet through the network.

14. The one or more non-transitory, computer-readable storage media of claim 13, wherein the tagging information includes at least one of source identifying information, destination identifying information, flow identifying information, path identifying information, a packet sequence number, and a time of interest.

15. The one or more non-transitory, computer-readable storage media of claim 14, wherein the time of interest includes at least one of a timestamp corresponding to an ingress time, a timestamp corresponding to an egress time, and a timestamp corresponding to a queued time.

16. The one or more non-transitory, computer-readable storage media of claim 12, wherein the plurality of instructions further cause the network computing device to store the captured trace data to a trace buffer of the network computing device, wherein to generate the trace data network packet that includes at least a portion of the captured trace data comprises to (i) retrieve the at least a portion of the captured trace data and (ii) insert the retrieved portion of the captured trace data into the trace data network packet.

17. The one or more non-transitory, computer-readable storage media of claim 12, wherein the network packet includes a header, wherein to determine the trace data of the network packet to be captured comprises to determine the trace data based on a retrieved portion of the header of the network packet.

18. The one or more non-transitory, computer-readable storage media of claim 12, wherein to determine the trace data of the network packet to be captured comprises to determine the trace data based on a predetermined threshold.

19. The one or more non-transitory, computer-readable storage media of claim 18, wherein to determine the trace data of the network packet based on the predetermined threshold comprises to determine the trace data of the network packet based on at least one of an identifier associated with the network packet, a present usage percentage of a trace buffer, a duration of time, a time window, a number of network packets received, and a size of the network packet.

20. The one or more non-transitory, computer-readable storage media of claim 12, wherein the plurality of instructions further cause the network computing device to compress the trace data based on at least one of a predetermined threshold and a tag associated with the trace data.

21. The one or more non-transitory, computer-readable storage media of claim 12, wherein to capture the trace data comprises to at least one of capture the trace data subsequent to a predetermined number of network packets having been received by the network computing device, capture the trace data at a trace buffer of the network computing device until a usage percentage exceeds a predetermined usage threshold, increment a counter of the network computing device, and compare a value associated with the network packet against a predetermined threshold.

22. The one or more non-transitory, computer-readable storage media of claim 12, wherein the plurality of instructions further cause the network computing device to determine one or more performance tracing settings of the network packet, wherein to capture the trace data corresponding to the network packet comprises to capture the trace data based on the one or more performance tracing settings of the network packet.

23. A network computing device for tracing network performance, the network computing device comprising:
   network communication management circuitry to (i) receive a network packet generated by a source endpoint node and (ii) process the received network packet; and
   means for capturing trace data corresponding to the network packet as it is processed by the network computing device, wherein the trace data includes one or more characteristics of one or more components of the network computing device,
   wherein the network communication management circuitry is further to transmit the received network packet to a target endpoint node, and
   further comprising means for generating, subsequent to transmitting the received network packet, a trace data network packet that includes at least a portion of the captured trace data, wherein the at least a portion of the captured trace data included in the trace data network packet is usable by a destination endpoint node to monitor performance of the network,
   wherein the network communication management circuitry is further to transmit the trace data network packet to the destination endpoint node.

24. The network computing device of claim 23, further comprising means for inserting tagging information into the trace data network packet, wherein the tagging information is usable by the destination endpoint node to reconstruct a trace corresponding to the received network packet through the network.

25. The network computing device of claim 23, further comprising means for storing the captured trace data to a trace buffer of the network computing device, wherein the means for generating the trace data network packet that includes at least a portion of the captured trace data comprises means for (i) retrieving the at least a portion of the captured trace data and (ii) inserting the retrieved portion of the captured trace data into the trace data network packet.

\* \* \* \* \*